United States

[11] 3,622,995

| [72] | Inventors | Uselma C. [...]<br>Bloomfield Hills, Mich.;<br>James E. Hopkins, Berwyn; Carl W.<br>Marquis, Lionville; Howard R. Nonken,<br>Downingtown, Pa. |
|---|---|---|
| [21] | Appl. No. | 809,277 |
| [22] | Filed | Mar. 21, 1969 |
| [45] | Patented | Nov. 23, 1971 |
| [73] | Assignee | Burroughs Corporation<br>Detroit, Mich. |

[54] AUTOMATIC TICKET/CREDIT CARD CHECK-IN SYSTEM
16 Claims, 11 Drawing Figs.

[52] U.S. Cl. .................................................. 340/153,
179/2 CA, 235/61.7 R, 235/61.9 R, 340/149 A
[51] Int. Cl. ...................................................... G07f 7/02
[50] Field of Search .......................................... 340/149,
149 A, 153, 147; 194/4; 235/61.7, 61.9; 179/2 CA

[56] References Cited
UNITED STATES PATENTS

| 2,754,496 | 7/1956 | Embry et al. .................. | 340/149 |
| 3,356,021 | 12/1967 | May et al. ..................... | 235/61.9 |
| 3,394,246 | 7/1968 | Goldman ....................... | 340/149 |
| 3,445,633 | 5/1969 | Ratner .......................... | 235/61.7 |
| 3,502,185 | 3/1970 | Osaki ........................... | 194/4 |

Primary Examiner—John W. Caldwell
Assistant Examiner—Howard Cohen
Attorney—Carl Fissell, Jr.

ABSTRACT: Data processing systems for automatic, on-line checking of numbered reservations and/or the control of credit card purchases, without referencing any data on the ticket or credit card itself. Such systems include a central processor, a remotely addressable central data store for reservation and customer account information, and remote terminal input apparatus, printer apparatus and ticket or card number reader apparatus. The remote terminal input apparatus includes ticket, credit card and freight bill number readers, in addition to keyboard input apparatus for on-line access to numbered reservations or accounts. One such system also includes automatic boarding pass issue apparatus responsive to the central processor system and pass-operated boarding gate apparatus.

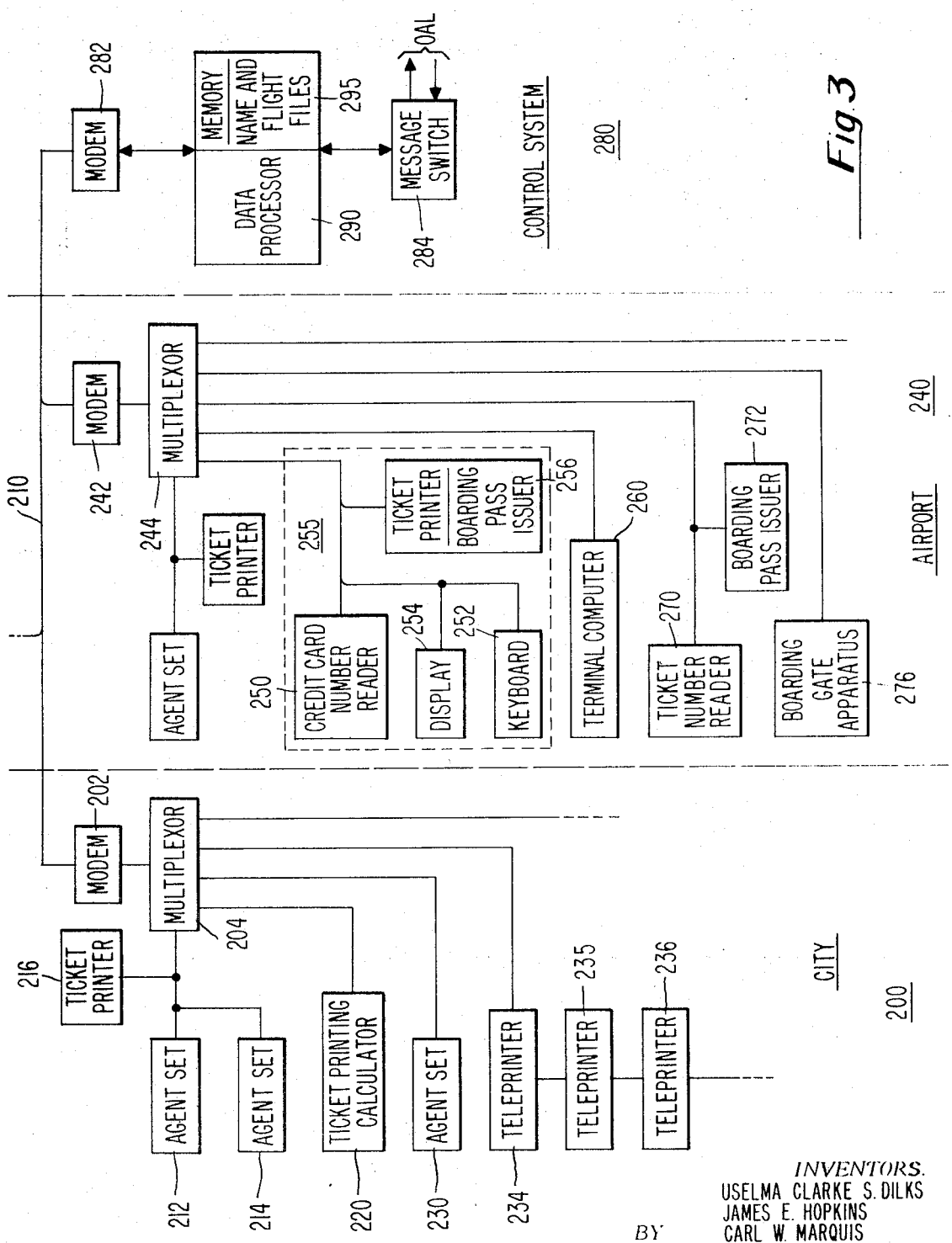

PATENTED NOV 23 1971

| BINDING STUB | ISSUED BY | IATA | INTERNATIONAL AIRLINES | PASSENGER TICKET AND BAGGAGE CHECK | SOLD SUBJECT TO CONDITIONS OF CONTRACT ON REVERSE SIDE | | TICKET DESIGNATOR |
|---|---|---|---|---|---|---|---|
| | | | COUPON IDENTIFICATION | | 1D75D75 | TC123ABCD67890 |
| 1 | PASSENGER NAME | | | FLIGHT COUPON 1 | | | |
| 2 | GOODMAN HJ CMDR | | | | | | |
| | GOOD FOR PASSAGE | AIRLINE | FLIGHT NO. | CLASS | DATE OF FLIGHT | TIME | STATUS OK SEAT/BERTH | FARE BASIS | NOT VALID BEFORE | NOT VALID AFTER |
| 3 | FROM CHICAGO OHARE | XYZ | 4567A | F | 21DEC | 1045P | A10B | FX | 21DEC | 21JAN |
| 4 | TO NEW YORK JFK | BAG ALLOW 44K | NYC XYZ 1234F BDL ABC 9876F BDS |
| 5 | | |
| 6 | CHI XYZ FX NYC XYZ FX BDL ABC FX BOS 14635 CAB YE30 CHI |
| 7 | |
| 8 | FARE US$ 237 80 | ZZA YE30 XYZ STL-C 8945 ZZA AO CHI 1234 |
| 9 | TAX US$ 11 89 | |
| 10 | TOTAL 249 69 | MC0014801 2345672 PL ZYL 22OCT67 7752890 |
| 11 | EQU. CAN 268 45 | 12DEC68 CHICAGO 331 | THIS FLIGHT FOR MEN ONLY |
| 12 | AMT. | TX | COUPON VALUE | CK CPN QUAL | CPN NO | COMM CODE | AIRLINE | TICKET FORM AND SERIAL NUMBER | CK | PLACE OF ISSUE | FORM OF PAYMENT |
| 13 | | | | | | | 0100731267893241 | 12345670123456789167946512 |
| 14 | | 5458931405 |
| 15 | |
| 16 | |

Fig.5

| EVERYONE'S AIRLINES | ISSUED BY | PASSENGER TICKET AND BAGGAGE CHECK PASSENGER RECEIPT | | FOR ISSUING OFFICE ONLY | | 004 201 8181588 | |
|---|---|---|---|---|---|---|---|
| SOLD SUBJECT TO CONDITIONS (ETC.) | | ORIGIN NYC | | FR/TO | FAIR CALCULATION | FARE | |
| NAME OF PASSENGER (NOT TRANSFERABLE) GRAHAM, H.J. | | DESTINATION BRU | | | | TAX | |
| DATE OF ISSUE 4 DEC. 68 | | VALID UNTIL 14 FEB. | | | | TOTAL | |
| ISSUED IN EXCHANGE FOR CK | | DATE/PLACE ORIG. ISSUE 4DEC/PITTS | | | | FORM OF PAYMENT | |
| TICKET DESIGNATION | ROUTE CODE 170 | ACCT. DEPT. USE | | | | CREDIT CARD NO. | |
| FROM NYC:JFK | | FARE BAS | CARRIER | FLIGHT | DATE | TIME | STATUS | CONJUNCTION TICKET(S) | |
| TO BRUSSELS | | FX | XYZ | 179 | 14 JAN | 0730P | B10 | ENDORSEMENT | |
| TO NYC:JFK | | FX | ABC | 3/4 | 29 JAN | 1015A | 10A | CHECKED BAGGAGE | |
| TO | | | | | | | | PCS | WT | PCS | WT | PCS | WT |
| TO | | | | | | | | | | | | | |
| FLIGHT SEGMENT 1 | FLIGHT SEGMENT 2 | FLIGHT SEGMENT 3 | | FLIGHT SEGMENT 4 | | CODED TICKET NUMBER 004:201:8181588 | |

THIS END DOWN FOR TURNSTILE INSERTION

INVENTORS.
USELMA CLARKE S. DILKS
JAMES E. HOPKINS
BY    CARL W. MARQUIS
HOWARD R. NONKEN

George L. Kensinger
ATTORNEY

AUTOMATIC TICKET/CREDIT CARD CHECK-IN SYSTEM

BACKGROUND OF THE INVENTION

The growth of the airline business in recent years has created serious passenger congestion problems at the airports. This increased congestion will soon prevent continued growth at the same rate as that achieved to date. The advent of increasingly larger aircraft will also make the airport congestion problems more severe due to the larger instantaneous peak passenger loads caused by such aircraft.

The major carriers have recognized the need for improving passenger services at the airports through automation. An extensive analysis of the requirements for such improvements forms the basis for adoption of the present system. This system utilizes a machine-readable ticket and coupon number as a key to passenger records for automatic check-in and boarding, as well as other functions. The number is encoded for optical reading or for magnetic ink character recognition (MICR), which is presently used in banking systems in many countries of the world to process billions of the checks handled by the public each year.

This approach requires only minor modifications to existing tickets, yet it provides a simple, rapid, and dependable means of increasing airport throughput. Cutover can be accomplished in simple steps, without the problems of new procedures and controls which would be involved in ticketing systems more different from procedures currently in use.

The serial ticket number approach is based on many system considerations and trade-offs. Fundamentally, it assumes that ticket data, due to frequent reservation changes, is only system dependable if it is resident in and under the control of the airline system. Thus a simple, rapid means of retrieving the ticket data from a central system is provided to minimize communications costs and to provide rapid system response for airport check-in. Furthermore, the subject system is adapted to cost effectiveness in the broad range of airline requirements, from busy airport ticket offices (ATO's) to small city ticket offices (CTO's) and travel agents. A number of ticketing devices may be provided for the varied requirements and, by preprinting the machine-readable numbers on ticket booklets, handwritten tickets can also be used for automatic check-in and boarding.

When used for the management of a credit card system, the subject invention provides the means for subscribers to obtain information relating to whether the card should be honored, the maximum credit authorized for a prospective customer, and the total amount of outstanding charges accrued by the customer, for example. The system is also adapted to the control of ticket purchases against credit card accounts as well. The obtaining of information from a central data store is needed before extending credit since the cards themselves cannot readily be updated on their face if telephoned purchases on credit are permitted. The card itself would also not indicate whether it had been lost by its authorized user or whether payments had been defaulted.

Long-range requirements are also an important consideration. This new check-in system is compatible with the airline and credit card industry long-range goals of reducing the number of terminal devices required and the attendant communications loads. In a reservation system this is accomplished by reducing the number of tickets issued, foreshadowing the ticket-less airline. They system uses one basic ticket and credit card format on which is imprinted a number or other code that is the key for retrieving all necessary records in the system without reliance on the ticket or card data itself. This number can easily be a credit card number, ticket number, or a personal identification or account number for locating and accessing the relevant reservation or account information.

The use of a simple number key or other code on the ticket or card eliminates the communications problem imposed by other ticketing schemes. In many such schemes, volatile data must be encoded on a more elaborate ticket. The communications systems would be heavily burdened because it would have to transmit more data from input devices and these devices would be more expensive. Since the cost of such devices cannot be justified at all locations, adoption of such systems also involves the adoption of two fundamentally different ticketing schemes with the attendant complications of different procedures to accommodate them.

Many different ticket layouts may be utilized to implement the present invention in a reservation system. The existing interline data communication system can also be utilized to exchange the serial number and fare basis for ticketing when adopting this invention.

PRESENT RESERVATION SYSTEMS

Many innovations, from curbside baggage checking to "write-your-own" ticketing, are presently being used to relieve some of the airport congestion. The most significant innovation in passenger service to date has been the adoption of large computerized second generation reservation systems. These systems represent an enormous data processing capacity. The implementation of cathode-ray tube (CRT) agent sets and communication networks with these systems represents an information storage and retrieval capacity unequalled in any other industry.

At this writing there are hundreds of CRT agent sets operational in the world and soon many thousands will be serving a number of carriers. Yet planning is underway to augment these systems to provide for fare determination and ticketing in ways not contemplated when the systems were established. These systems represent a large financial investment and an enormous information handling capacity that the present approach utilizes to good advantage.

Passenger congestion is an acute problem during certain periods at some airport stations and is rapidly becoming more and more widespread, both in duration and geographical distribution. In the future, the use of larger aircraft will result in much larger peak volumes at the airports. Passenger load can more than double even with no increase in aircraft departures and arrivals per hour.

One of the most pressing problems is congestion at the check-in counter. This is often relieved by curbside check-in of baggage or by not requiring passengers with only carry-on baggage to check in at all. Much of the remaining load at the ticket counters consists of ticketing operations such as "will calls," reissues, special service tickets, and so forth, often combined with reservation changes. Many of these functions require an inordinate amount of time for even relatively simple transactions when compared to the time required to process the "normal" passenger. Fare determination or redetermination, checking reservations, writing or imprinting documents, removal of coupons and collating and stapling operations cause delays, interfere with the smooth flow of passengers and contribute to long waiting lines. Reduction of these administrative "paperwork" chores for passenger service agents is a vital element in the solution of airport congestion.

Larger aircraft will influence passenger flow at the airports in several ways. Higher peak loads will be experienced in processing passengers. Additionally, for the same payload there will be a reduction in the number of necessary departures, thus encouraging the airlines to use reservation services as an incentive to increase the demand for seats to the available capacity.

For the passenger, boarding and entering new aircraft with wide doors and two aisles, will be more like entering a theatre than a present day aircraft. To achieve rapid boarding, preboarding seat selection will often be used to avoid bottlenecks at the entrances and in the aisles.

One of the basic tenets of the subject invention is that the system be capable of accommodating the volume anticipated during the peak load periods, not merely the volume anticipated during average load periods. The percentages of reissued tickets and of NO-SHOW and GO-SHOW passengers at peak periods is usually quite different from the average mix, and it will be far different from the average during a bad-weather night. For example, the diversion of an aircraft from a planned departure will cause a passenger mix far different from the average. A system using a simple prenumbered ticket record key allows more efficient processing during these unusual peaks.

TICKET ISSUING LOCATIONS

One of the problems confronting such a system is the different requirements of ticket issuers. Of the hundreds of airports served by scheduled air carriers, some of them have far more severe congestion problems than others. Therefore, the establishment of a system for the automation of ticket issuing at the busiest locations should not impose unnecessary expense on the small stations, commercial accounts, and travel agents who, in the aggregate, issue a substantial portion of all tickets. Also, if automated check-in stations in the large airports are to be of most benefit, they must accept a high percentage of the tickets issued by the different types of ticketing stations.

Machine issuing of tickets and machine reading of tickets do not necessarily have to both be performed by all stations. Machine issuing without machine reading could be justified at some locations. Likewise, machine reading may be desirable wherein only a few of the tickets used were machine issued. There are many more stations that need to read tickets electronically than there are that have to issue them automatically.

Another problem for the system is to anticipate the future. Not only does the present system solve the problem of efficiently checking numbered reservation tickets, but it is also adapted to cutover from the present system to a new system, such as a ticketless reservation and check-in procedure.

SUMMARY OF THE INVENTION

According to one embodiment of the present invention, an automatic reservation check-in system issued numbered reservation ticket coupons, stores the ticket data in an automated system and responds to the ticket and coupon numbers preprinted or imprinted at the time of issue to permit boarding of passengers or cargo holding reservations. Both reservation check-in and boarding control are subject to the detection of a properly recorded reservation in the system. Other passengers and cargo not holding reservations can be subsequently boarded to utilize fully the capacity of accomodations available.

The invention is adapted to the reservation and control of accommodations for travel or touring and accommodations in hotels, auditoriums and the like. In addition to being applicable to the automatic check-in of tickets for reservations, the invention is responsive to the use of reservation numbers without tickets or credit card numbers for check-in. Provision is also made for the ready exchange of reservation data between different companies or systems providing different portions or different accommodations of a multisegment reservation.

One embodiment of the present invention includes a computerized reservation system for the storage and retrieval of passenger and cargo reservation data, input apparatus for entering reservation data into the system for storage in relation to an identifying number for each reservation, apparatus for checking reservation or ticket numbers against the numbered reservations stored in the system and means responsive to the reservation checking apparatus for validating admission to the reserved accommodations.

The reservation system may include a data processing system having means for storing a plurality of different numbered reservations for accommodations and means for identifying reservations for accommodations to be provided at the same time. The automatic check-in means may include ticket number reading apparatus and means for transmitting representative signals to the processing system for comparison with a list or group of reserved accommodations to be provided at the same time.

Additional features and embodiments of the present invention are described and illustrated in the following detailed description and in the accompanying drawings in which:

FIG. 3 is a detailed block diagram of apparatus included in an airline reservation system embodiment of the invention;

FIGS. 4 and 5 are illustrations of different ticket formats each carrying a ticket or code number for identifying the corresponding stored reservation for automatic check-in at the airport;

Figure 1:
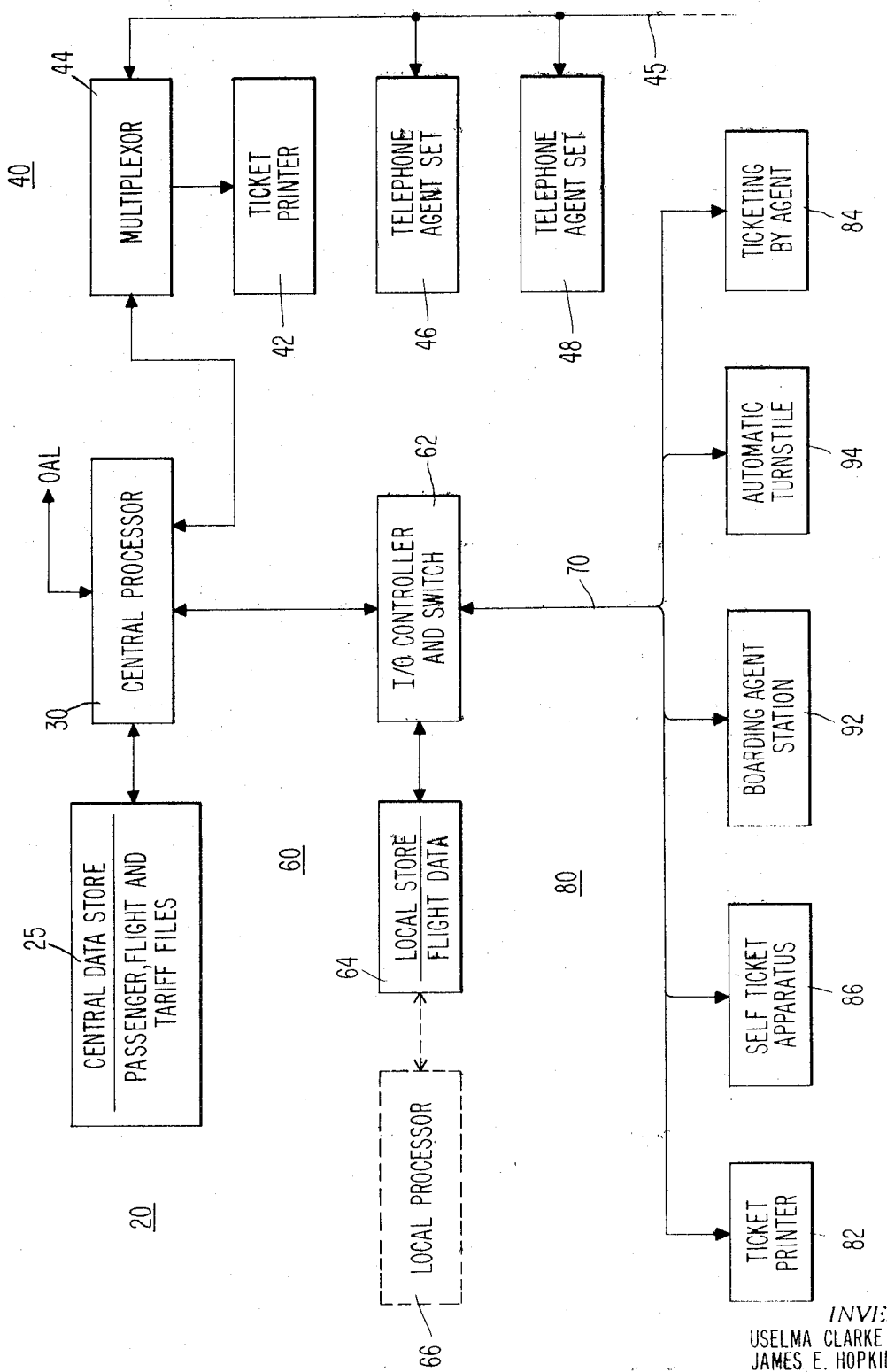
FIG. 1 is a block diagram of a system which may be utilized to practice the invention.

The system illustrated in FIG. 1 is organized for the storing of numbered reservations, the issuance of numbered tickets corresponding thereto and the automatic check-in of passengers and cargo holding reservations for transportation by aircraft. It is of course adaptable to the similar handling of reservations for other types of transportation or facilities. The system includes a central data processing system 20, a reservation and communications system 40, a local data storage and control system 60 and an airport terminal system 80.

Data processor system 20 is comprised of central data store 25 interconnected with central processor 30. The central data store contains reservation files for storing passenger information in the form of passenger name records and numbered reservations, data on flight capacities and data relating to the status of reservations. Also recorded in the central data store are tariff data and fare computation tables for use in pricing individual reservations.

Central processor 30 may be interconnected with the reservations system of other airline companies (OAL) in addition to being interconnected with the other portions of the system. The central processor receives input information for updating records in the central data store from reservation ticketing system 40 and transmits data to inquiring reservation and ticketing stations and to local storage and control system 60.

Reservation office 40 includes multiplexer 44 of any suitable well-known design interconnected with ticket printer 42 and with telephone agent sets 46 and 48 over cable 45. The agent sets transmit reservation input data for storage in the system and retrieve information from the central processor system for use in making reservations, for ticketing and for billing. The key number used for identifying each reservation to be stored in the system may be determined by the number appearing on preprinted ticket or coupon stock provided to the reservation office, may be obtained from the central processing system or may be selected from a list of reservation numbers that are available. An example of an agent set suitable for use in this invention may be seen in Lasoff et al. U.S. Pat. application Ser. No. 613,264, filed Feb. 1, 1967, for "Display Unit," assigned to the same assignee as this invention.

Local storage and control system 60 is comprised of I/O controller and switch 62 interconnected with local stores 64 and may further include a local processor 66 interconnected with the local store. Airport terminal system 80 includes ticket printer 82, agent ticketing station 84 which may comprise an agent set, self-ticketing apparatus 86, boarding agent station 92 and automatic turnstile 94, each interconnected with I/O controller and switch 62 by cable 70. An example of an I/O controller and switch may be seen in Belcher et al. U.S. Pat. application Ser. No. 652,759, filed July 12, 1967, for "Communications System and Remote Scanner and Control Units," assigned to the same assignee as this invention.

The I/O controller and switch 62 operates to transfer flight data from the files of central data store 25 for storage in local data store 64. This may be either a preselected time before departure of the flight or as soon as space for it becomes available in the local store. Boarding control is then under immediate control of the files stored in the local store. I/O controller 62 also transmits data between central processor system 20 and the apparatus of airport terminal system 80. The I/O controller and switch also directs the transmission of data between different airport terminal apparatus including local processor 66 during ticketing, check-in, and boarding. The various flight data held in local store 64 may alternatively be updated and character recognition data analyzed by local process 66 to which it may be routed by I/O controller and switch 62. Information relating to individual reservation is entered into the data processing system either by agent sets 46, 48, by agent ticketing station 84 or by self-ticket apparatus 86 which may be located at airline city ticket offices or at the airport terminals. Data corresponding to an identifying reservation number is transferred to the data processing system and the number is also imprinted on the ticket by printer 82 if not preprinted on the ticket stock. These ticket numbers are read at boarding agent stations 92 at the time of check-in and by automatic turnstile 94 at the time of boarding. Alternatively, boarding agent station 92 may be caused to issue a special boarding pass after a reservation has been checked-in which must then be presented at the automatic turnstile 94 to gain admission to the aircraft.

The function of self-ticket apparatus 86 is to automatically provide a single segment machine-issued ticket to a passenger who provides a machine-readable numbered credit card and the necessary data for ticketing and reservation. The corresponding data files are held in central data store 25 and are checked by central processor 30 responsive to operation of the self-ticket apparatus. Central processor 30 also retrieves and updates the passenger and flight data files in the central data store upon entering each reservation and printing a ticket therefor. The flight files may alternatively be updated and otherwise processed by local processor 66 through its interconnection with local store 64.

Figure 2:
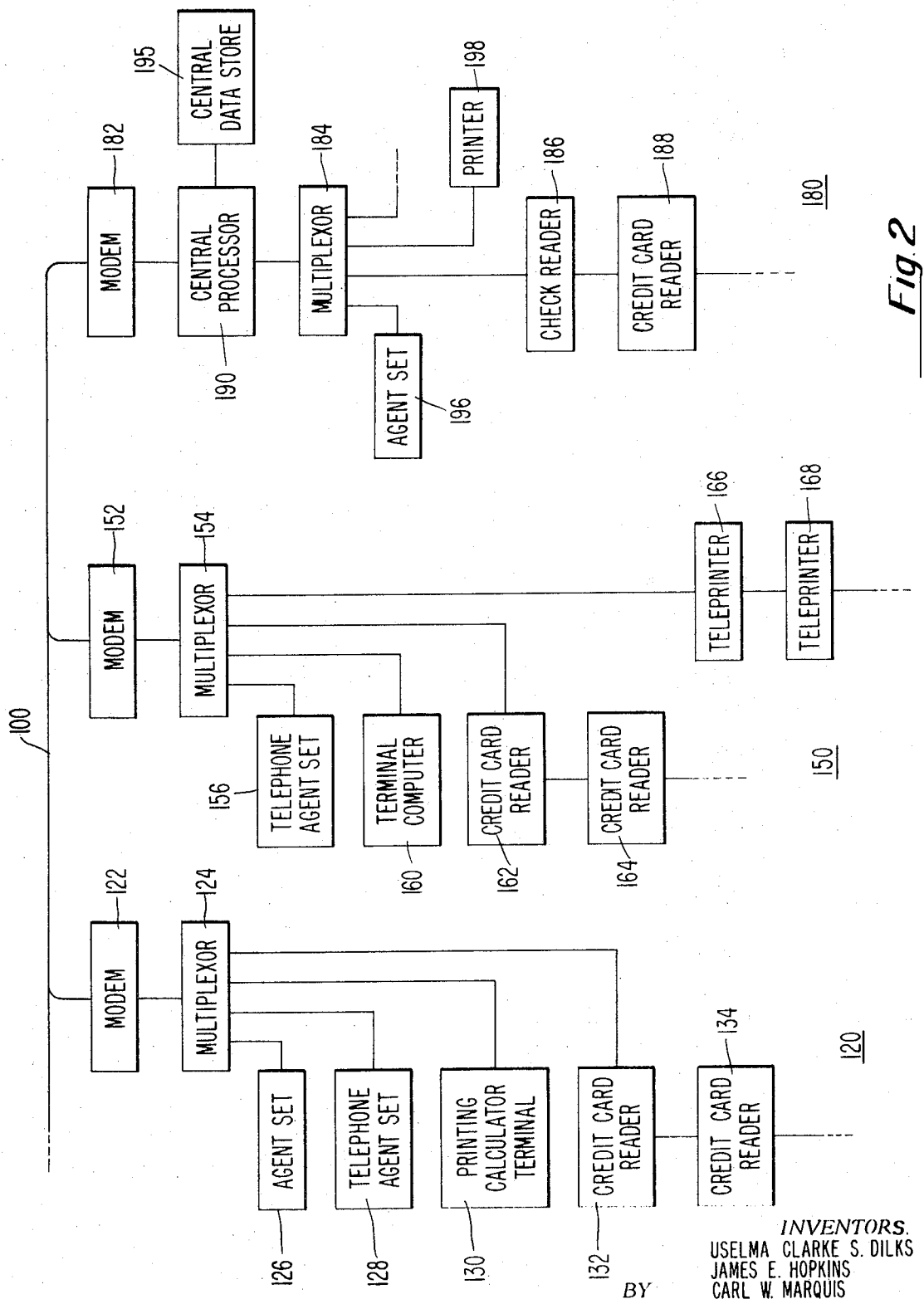
FIG. 2 is a detailed block diagram of a system adaptable for practicing the invention with credit card or bank account numbers being used for identifying and charging reservations or other purchases.

The system illustrated in FIG. 2 includes first and second reservation offices 120 and 150 interconnected with a central data processor system 180 for automatically handling reservations or other purchases without reliance on tickets. Communication bus 100 transmits data and control signals between modulator-demodulators (modems) 122, 152 and 182. Other terminals may likewise be connected to transmission bus 100 through a similar modem.

Terminal stations 120 and 150 include multiplexers 124, 154, Agent Sets 126, 128, 156, and Credit Card Readers 132, 134, 162 and 164. Additionally, station 120 includes printing calculator terminal 130 interconnected with multiplexer 124 and station 150 includes terminal computer 160 and teleprinters 166 and 168 interconnected with multiplexer 154.

Central processor system 180 includes central processor 190 interconnected with modem 182, central data store 195 and multiplexer 184. This multiplexer is further interconnected with check reader 186, credit card reader 188, agent set 196 and printer 198. In the operation of the apparatus of FIG. 2 as a reservation system, trip data is transmitted from agent sets 126, 128, 156 to central processor 190. This causes the reservation to be stored in central data store 195 if space is available and the agent set is signalled that the reservation is made. Otherwise, the central processor signals the requesting agent set to make another selection. The identifying code or number for the reservation can then be transmitted to the data processor system by the person operating the agent set from a list of available reservation codes or numbers. Alternatively, the reservation can be identified by a credit card account number or bank account number which can be read by credit card readers 132, 134, 162 or 164.

Automatic check-in of these reservations can be initiated through agent sets 126, 128, 156, 196 or through credit card readers 132, 134, 162, 164 and 188. Check-in can also be initiated through teleprinters 166 and 168. Any one of these units can transmit the identifying code or number of the reservation for comparison against a list of reservations for the same flight or departure. Upon detection of a match between a reservation code or number and a reservation stored in central data store 195, central processor 190 transmits a signal validating admission to the reserved accommodation.

Printing calculator terminal 130 and terminal computer 160 are provided for controlling or performing any computations or processing which is required at the terminal stations of the system. These calculations may include certain fare and tariff calculations for passengers and freight. Such local processing may include handling passenger boarding conditions and various other processing relevant primarily to the local stations. An example of a printing calculator terminal may be seen in Looschen et al. U.S Pat. No. 3,417,387, issued on Oct. 22, 1968, for "On-Line Banking System." An example of a terminal computer suitable for use in this invention as either a computing terminal or as a ticketing device may be seen in Perkins et al. U.S. Pat. application Ser. No. 723,088, filed on Apr. 22, 1968, for "Data Processing Apparatus," assigned to this assignee.

When the system of FIG. 2 is used as an accounting system for charging purchases against charge accounts or bank accounts, the input information is entered into the central processor system by the various agent sets and the account is identified either through the agent set or through one of the credit card number readers. In such case, central data store 195 stores the information relevant to each of the accounts and central processor 190 updates the account balances in response to signals representing new purchases and payments, subject to control codes stored with the account data. Payments into such accounts may be credited through the operation of check reader 186 either alone or in concert with credit card number reader 188 for identifying the account. Payments to the account may also be entered through agent set 196 by way of multiplexer 184, as well.

The airline reservation and control system shown in FIG. 3 is comprised of city ticket office 200 and airport terminal office 240 each interconnected with central control system 280 over bus 210 through modems 202, 242 and 282. Any desired number of additional ticketing offices or stations can also be connected onto bus 210 through suitable communication adapters. The selling of reservations, printing of tickets and acceptance of reservation changes, etc., can be performed at any of the ticketing offices or airport terminals which are connected in the system.

City ticket office 200 is comprised of agent sets 212, 214, 230, ticket printer 216, ticket printing calculator 220 and teleprinters 234, 235 and 236, each being interconnected with modem 202 through multiplexer 204.

Central control system 280 is comprised of data processor 290 and memory 295 each interconnected with modem 282 and message switch 284 which is adapted to be connected to reservation or communications systems of other airlines (OAL). Memory 295 contains fields for storing passenger name and flight files in addition to any other data desired for the reservation ticketing and boarding control function. Data processor 290 is responsive to inquiries from other units in the system through modem 282 for supplying or receiving data relating to the reservation files in memory 295 and for performing fare and tariff calculations for reservation and ticketing stations. Data processor 290 may also be programmed to perform periodic checking of stored reservations for expired ticket time limits or expired confirmation time limits and other controls relevant to particular flights. Such control processing by the data processor may by programmed for automatic operation responsive to a critical booking level of reservations on individual flights, for example.

Airport terminal office 240 is comprised of self-operated ticketing unit 255 including credit card reader 250, keyboard input unit 252, display unit 254, and ticket printer and boarding pass issuer 256, and terminal computer 260, ticket number reader 270, boarding pass issuer 272 and boarding gate apparatus 276, together with agent sets and ticket printers, each interconnected with modem 242 by way of multiplexer 244. Ticket number reader 270 communicates information signals to the central control system which correspond to the reservation numbers of tickets presented to it. Data processor 290 then analyzes the raw data signals for symbol recognition if not done by the reader itself in the automatic check-in operation. Reader 270 may also partially process the raw input data signals and, in concert with boarding pass issuer 272, prepare passengers or cargo for boarding either at the time of automatic check-in of the reservation or subsequently. Boarding gate apparatus 276 is responsive to boarding passes or the ticket itself, if desired, to control admission to the aircraft subject to control by the system.

Data relating to a passenger's itinerary together with a request for a reservation may be inserted into the system either by the agent sets of city ticket office 200, by the agent set at the airport terminal office or through credit card number reader 250 and keyboard input unit 252 of self-operated ticketing station 255 at the airport terminal. Once a suitable reservation is found to be available from the data processor, the necessary passenger identification and reservation data, including the ticket or reservation number, is communicated to the central control system for storage in the memory in relation to the number. Subsequently, the reservation data can be interrogated by an agent set, keyboard unit or ticket number reader when changing reservations and entering new information or performing automatic check-in in preparation for boarding. The number read from the ticket or entered by keyboard is used as a code number for identifying and locating the reservation stored in the memory in these operations. This technique of accessing numbered reservations stored in the control system may also be used at boarding gate apparatus 276 for controlling the admission to the reserved accommodations.

FIGS. 4 and 5 illustrate two representative ticket formats each carrying a ticket or reservation code number suitable for use in practicing the invention. In the representative ticket of FIG. 4 the reservation or ticket code number appears in the middle of the ticket at the bottom. The number includes fields signifying the coupon number of the ticket, the airline identifying number and a larger field which indicates the ticket form and an arbitrary serial number. A check digit useful for checking the accuracy of transmission of the number in the system is appended to the number. Such ticket coupons may be available in bound booklets of four, eight or 12 coupons, for example, for use with any desired multisegment itineraries. Any coupons in such a booklet unnecessary for a given itinerary are removed from the booklet and destroyed before issue to the passenger. Identification of the issuing airline in the ticket number is desirable for interline billing purposes and for assuring the transmission of reservation data and changes between different airlines involved in the itinerary for reservation updating purposes, etc. In the case of ticket booklets as in FIG. 4, the ticket number is ordinarily preprinted individually on each coupon in order to assure machine readability of the number on each coupon.

FIG. 5 illustrates a representative single coupon multisegment machine-readable ticket for use in practicing the subject invention. The ticket or reservation code number in this format appears in the upper right-hand corner of the ticket in optical character (OCR) format and the lower right-hand corner in MICR format. This ticket number can also be formed of different fields for indicating desired information such as the coupon number, identity of the issuing airline, ticket form number, class of reservation, miscellaneous baggage information, together with a serial number. The number on single coupon tickets may be either preprinted or imprinted at the time of the issue.

The ticket number may be used either as an address at which the reservation is stored in the memory of the central processor system or as a key member for storage in an associative memory together with the data to enable access to the data for checking, changing or automatic check-in of the reservation. The single coupon ticket of FIG. 5 may also be used as the boarding pass itself for insertion into a turnstile such as automatic turnstile 94 of FIG. 1 indicated on the right edge of the ticket number. The number is simply read and transferred to the control system together with identification of the flight for allowing admission to the reserved accommodation.

Figure 6:
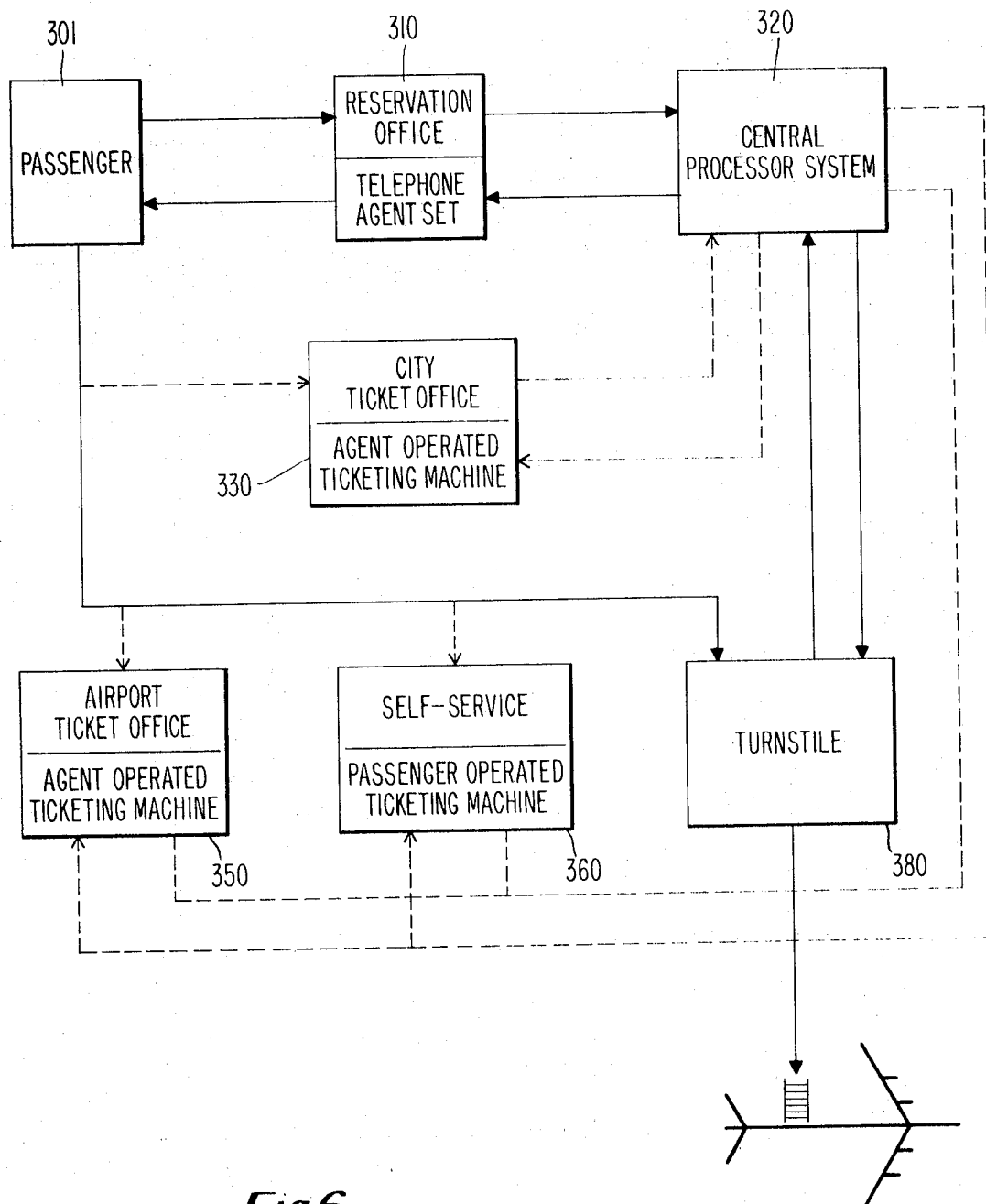
FIGS. 6–8 are representations of the passenger interface with, and the flow of data and control signals in, a system for practicing the invention.

FIG. 6 illustrates the passenger interface and flow of data and control signals in a system for practicing the invention. The first contact that passenger 301 makes with the system is with reservation office 310 by telephone, from which a request for a reservation is sent to central processor system 320 by an agent set. Reservation data for an available accommodation together with an identifying number is stored in the central processor system. Before the flight, the passenger may contact any such reservation office 310, city ticket office 330 or airport terminal office 350 or 360, for example, for checking on the status of his reservation or of any of the flights involved or to change his reservation in any particular if the desired accommodation is available. The passenger can also be required to confirm his reservation during a given period before each flight at any of these offices. During each contact with the system the desired information may be obtained merely by transmitting to the central processing system the ticket code number along with a request for the desired data.

On the day of boarding the passenger may be permitted to simply insert his ticket into automatic turnstile 380 for gaining admission to the aircraft or, if desired, the passenger may be required to present his ticket to either airport ticket office station 350 or to self-service check-in station 360 a given time before the flight to allow for automatic check-in based upon the ticket number. He may further be required to subsequently present his ticket to such a station for the lift or surrender of his ticket and for receiving a boarding pass provided for his flight to be used at automatic turnstile 380. Each time the reservation is checked or a ticket is presented for automatic checking or boarding pass issuance, only the ticket number need be read and transferred to the system together with a signal indicating the operation to be performed. This provides a great savings in reading and communications time and in expense of the operation. Also, each operation is advantageously under control of central processor system 320. Any time that a ticketed reservation cannot be processed due to difficulties in communication, reading or matching a reservation to the ticket number, the passenger will be directed to an airline agent for handling the operation. The probable point of ticket purchase is at the airport ticket office for multisegment ticketing and at the self-service ticketing station for a single-segment ticketing, although ticket purchase is also available at the city ticket office if convenient for the passenger.

Figure 7:
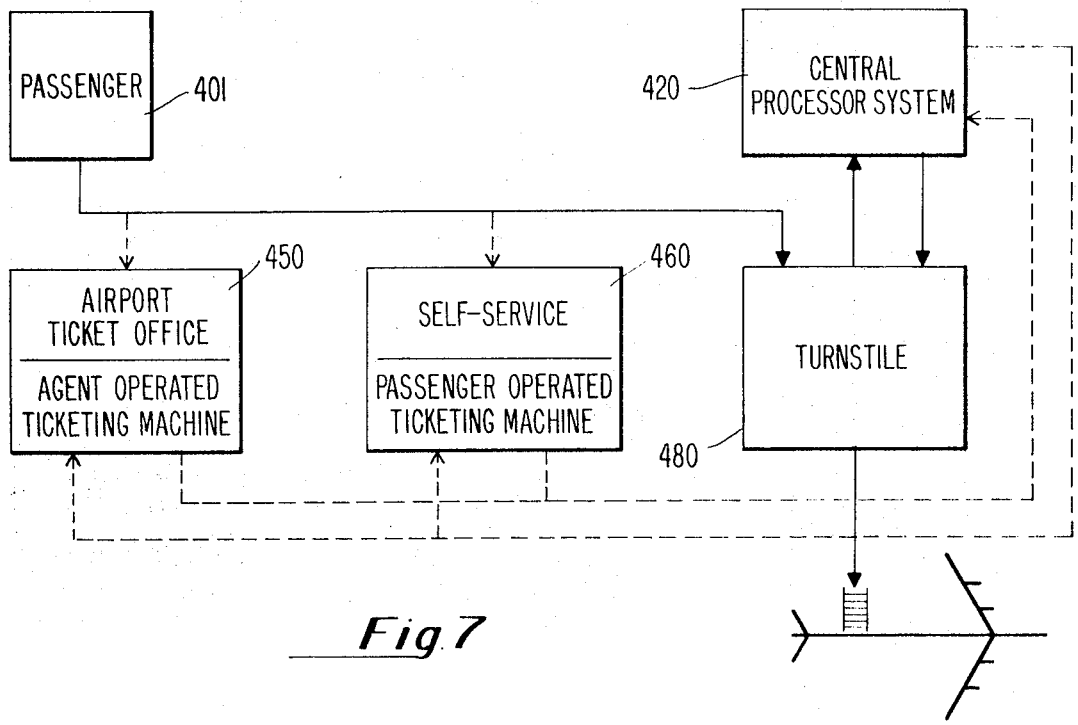
Figure 8:
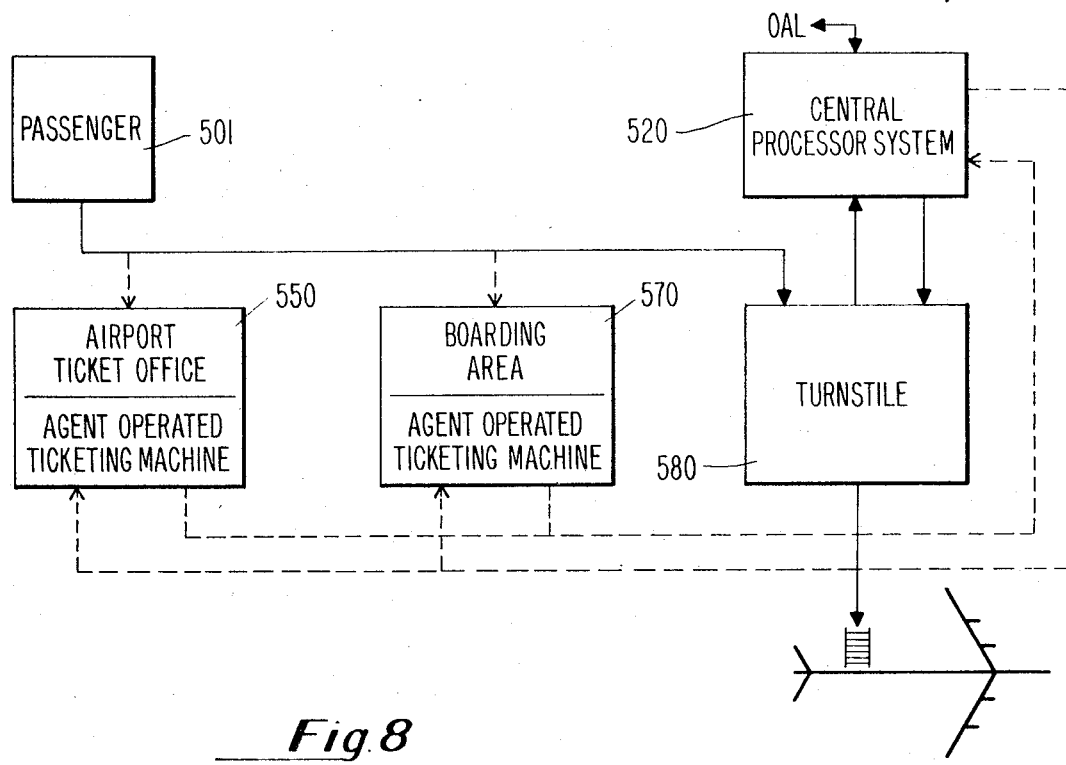

FIGS. 7 and 8 illustrate passenger interface and signal flow in a portion of a system similar to that of FIG. 6 in which a passenger does not hold a reservation or holds an OAL reservation, respectively. Each of the components of the system of FIGS. 7 and 8 are numbered similarly to the corresponding component of FIG. 6, with only the first digit changed. Boarding area check-in station 570 is additionally included in the system of FIG. 8 for providing automatic check-in and boarding control of passengers holding reservations from other airlines prior to use of automatic turnstile 580. In this instance, a boarding pass issue procedure may be desirable due to possible difficulties and complexities in reading tickets issued by other airlines at the boarding control area. Each of the component units of FIGS. 6–9, of course, may include or utilize the corresponding apparatus of FIGS. 1–3.

If a passenger holds a reservation, he presents himself to either airport ticket office 450 or self-service ticketing station 460 in order to obtain space available on a flight and purchase a ticket. His trip data together with an identifying reservation number is transferred to the system just as in the case of advanced reservations. This operation also satisfies the requirement of check-in since the flight accommodation obtained would ordinarily have a departure time within the period ordinarily designated for check-in. Passengers need merely proceed to a unit such as self-service check-in station 460 for system boarding control or obtaining a boarding pass. He then proceeds to automatic turnstile 480 for admission to the aircraft.

In the case of passenger 501 who holds an OAL reservation, he presents his ticket at either airport ticket office 550 or boarding area check-in station 570 for automatic check-in and boarding control by the airline about to provide the reserved accommodation. Central processor system 520 will have previously received the reservation data together with the identifying reservation number from the other airline and will thus be prepared to respond to the presentation of the ticket to enable boarding of the aircraft. The automatic check-in and boarding control will therefore proceed on the ticket key number basis just as for every other reservation in the system. It is probable that self-service ticketing station 460 will ticket the majority of GO-SHOW passengers not holding a reservation and who present a credit card for purchase of accommodations due to the high percentage of single segment trips under these circumstances. If a passenger holds an OAL ticket he may likewise bypass airport ticket office 550 ordinarily located in the lobby area of the airport terminal and will interface with boarding area check-in and control station 570 before proceeding to automatic turnstile 580.

Figure 9:
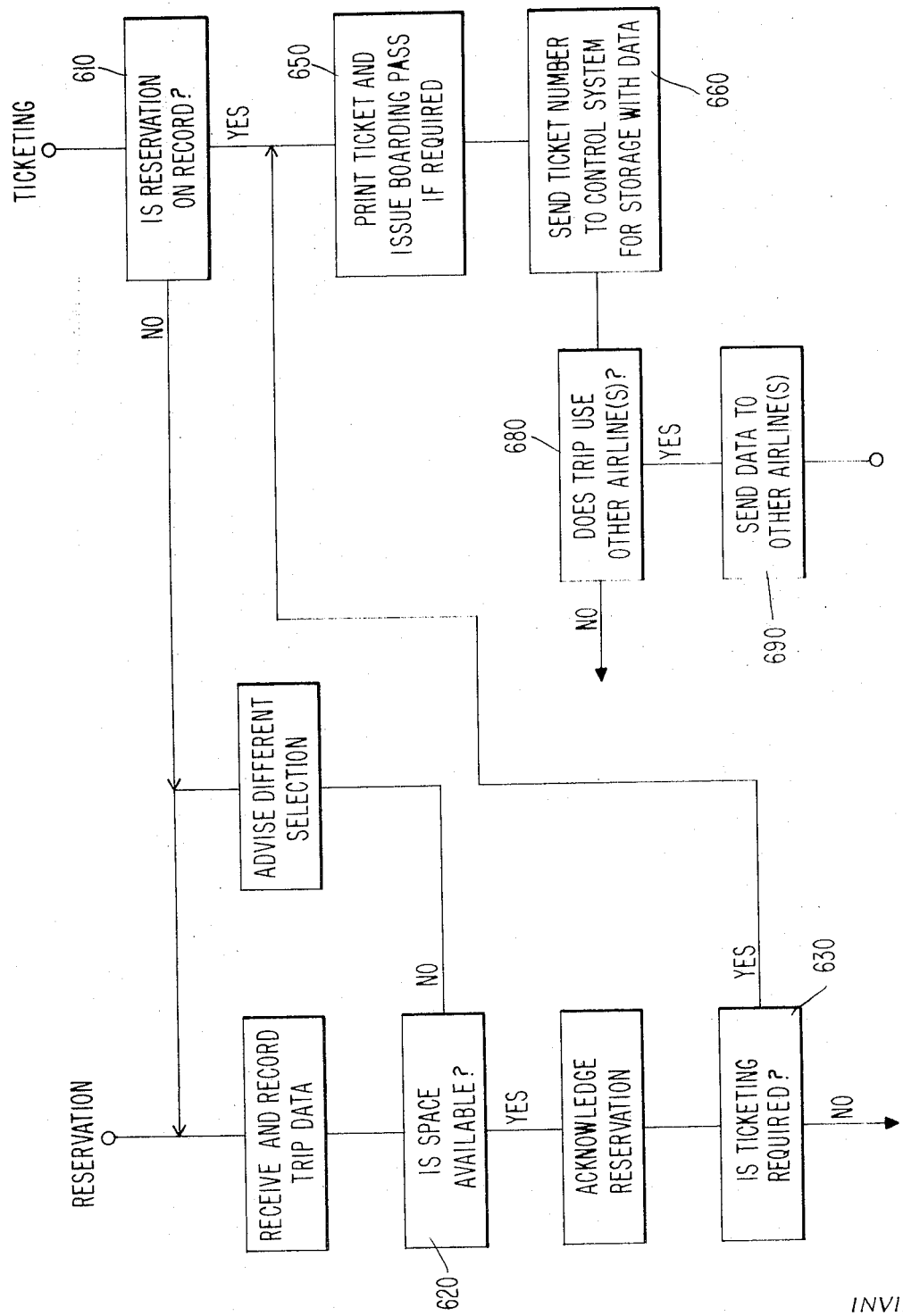
FIGS. 9–11 are logic diagrams illustrating the programmed response of a reservation system for practicing the invention.
Figure 10:
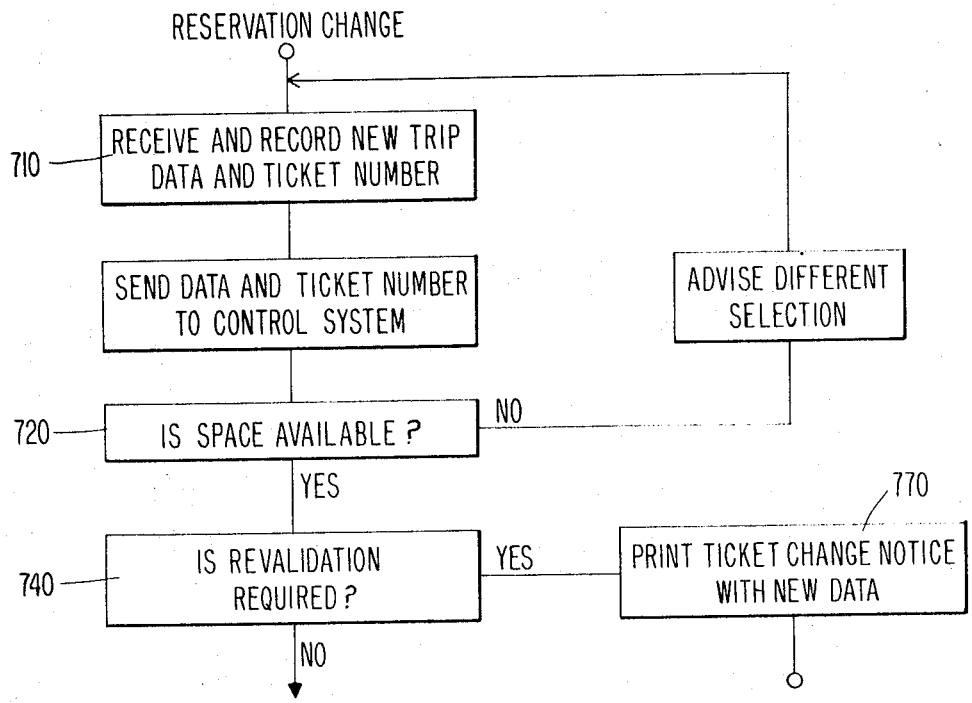
Figure 11:
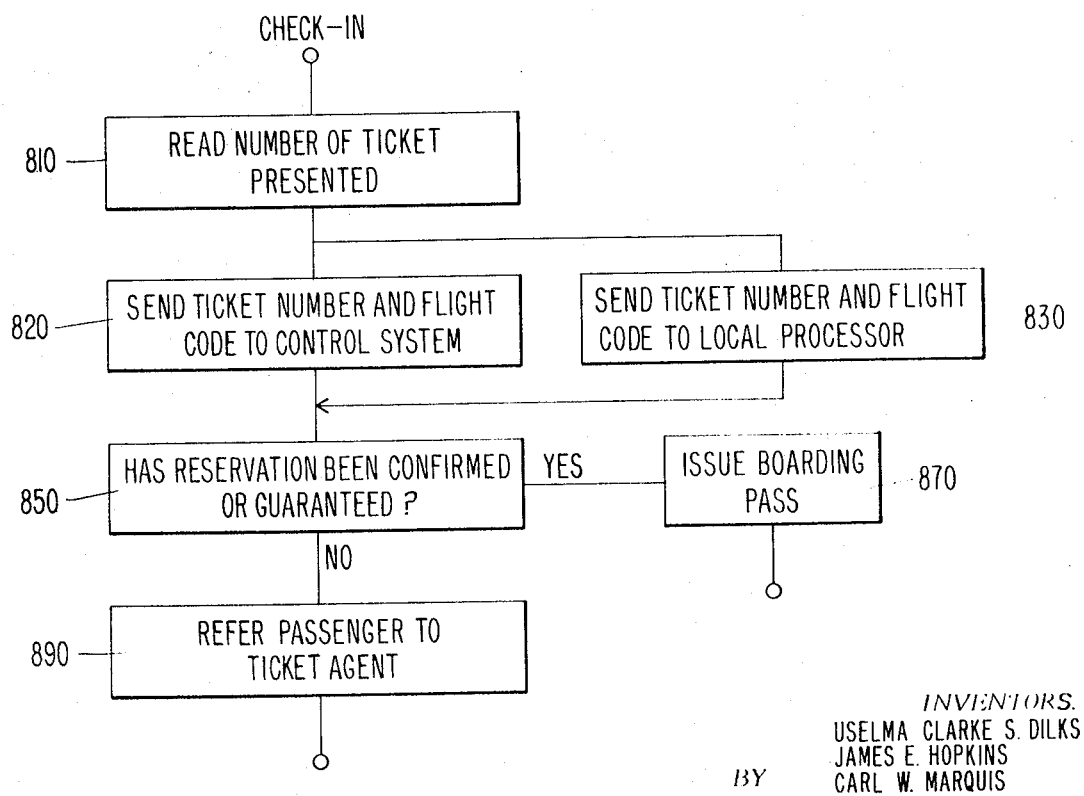

FIGS. 9-11 illustrate a representative programmed or logic-controlled response of reservation systems provided for practicing the invention. The system receives and records the trip data for a desired reservation and responds at time 620 to indicate whether or not the requested accommodation is available. If it is not, the system advises a different selection. Alternatively, each available flight for a requested trip segment may be displayed for selection of one by the passenger. Once a reservation for an accommodation is accepted and acknowledged, the system determines at time 630 whether or not printing is required. If it is, the system proceeds to step 650 for printing the ticket and issuing a boarding pass, if required.

If the reservation and ticketing operations are separated, then the system first determines whether a reservation is on record at time 610 prior to ticketing and proceeds to step 650 if a reservation is located. If there is no reservation on record the system proceeds to receive and record the data and to record a reservation for an available accommodation prior to ticketing. Once the ticket is printed at step 650, the system proceeds to send the ticket number to control system at time 660 in order that the reservation data may be stored in relation to its identifying code number. The system then determines at time 680 whether the trip or itinerary uses facilities of other airlines at step 690 if appropriate.

As is indicated in FIG. 10, the system responds to a request for a reservation change by receiving and recording the new trip data together with the previously provided ticket number at time 710 and proceeds to determine at time 720 whether or not the desired new accommodation is available. If it is, the system proceeds to record and acknowledge the reservation and to determine whether revalidation is required at time 740. If it is, the system proceeds at time 770 to print a ticket change notice with the new data or prints an entirely new ticket, if desired, at step 770.

As indicated in FIG. 11, when a passenger presents his ticket for automatic check-in at time 810 the system reads the ticket number. The number is sent together with identification of the flight to the central control system at step 820 or to the local processor at step 830 depending upon whether or not the system utilizes a local processor as in FIG. 1. It then proceeds to determine whether or not the reservation has been confirmed or guaranteed at step 850. In adapting the invention to handle reservations without ticket issuance, the system simply transmits the reservation code or number to the central processor system or the local processor for check-in of the reservation from a keyboard or credit card reader in lieu of reading a ticket. If a reservation has been confirmed or guaranteed, the system proceeds to issue a boarding pass at time 870. If the reservation was not confirmed or guaranteed, the system refers the passenger to an airline ticket agent at step 890.

Of course many variations and modifications of the subject invention are possible in light of the above teachings. It is, therefore, to be understood that within the scope of the appended claims the invention may be practiced otherwise than as specifically described.

We claim:

1. An automatic reservation check-in system comprising:
   a data processing system having memory means for storing information relating to a plurality of reservations for accommodations to be provided at different times,
   means responsive to a request for a reservation for issuing a ticket bearing a code number identifying reservation information,
   input means for providing reservation information to said processing system for storage in said memory means in relation to said identifying reservation code number,
   automatic check-in means for comparing reservation code numbers presented thereto with the code numbers of stored reservations relating to similar accommodations, and
   means responsive to the detection of correspondence between a reservation code number presented to the check-in means and a stored reservation for automatically controlling the grant of the reserved accommodation.

2. The automatic reservation check-in system of claim 1 wherein the data processing system further comprises means for providing different lists of numbered reservations for accommodations to be provided for the same class and the check-in means identifies the class of the reservation number presented.

3. The automatic reservation check-in system of claim 1 wherein the reservation code number appears on a ticket in a machine-readable font and the automatic check-in means comprises ticket number reader apparatus.

4. The automatic reservation check-in system of claim 1 wherein the reservation code number appears in magnetic ink character recognition (MICR) font and contains information relating to the identity of the issuing system and a serial field which is arbitrary with respect to the reserved accommodation to which it is assigned by the system.

5. An automatic reservation check-in system comprising:
   a data processing system having means for storing information relating to a plurality of reservations for different dated accommodations and means for identifying reservations for accommodations to be provided at the same time,
   means responsive to a request for a reservation for issuing a code number identifying reservation information,
   input means for entering into the information storage means a plurality of different reservations each together with a unique ticket reservation code,
   automatic check-in means for sensing and comparing reservation code numbers, when presented, with that of stored reservation for accommodations to be provided at that time, and
   means for indicating correspondence between a stored reservation and a reservation code number presented.

6. The automatic reservation check-in system of claim 5 wherein said code issuing means issues a ticket code number which is arbitrary with respect to the reserved accommodation and is serial in part.

7. The automatic reservation check-in system of claim 5 wherein the data processing system further comprises means for providing different lists of numbered reservations for accommodations to be provided for the same class and the check-in means identifies the class of the reservation number presented.

8. The automatic reservation check-in system of claim 5 wherein the reservation code number appears on a ticket in a machine-readable font and the automatic check-in means comprises ticket number reader apparatus.

9. The automatic reservation check-in system of claim 5 wherein the reservation code number appears in magnetic ink character recognition (MICR) font and contains information relating to the identity of the issuing system and a serial field which is arbitrary with respect to the reserved accommodation to which it is assigned by the system.

10. An automatic reservation check-in system comprising:
  addressable memory means for storing information relating to a plurality of different reservations for accommodations,
  means responsive to a request for a reservation for issuing a code number identifying reservation information,
  input means for entering reservation information into said memory means for storage in relation to said identifying reservation code for each such reservation,
  means for automatically checking reservation codes against the reservations stored in the memory means when the codes are presented for use of a specific accommodation, and
  means responsive to the reservation checking means for validating the grant of the reserved accommodation corresponding to the reservation code presented.

11. The automatic reservation check-in system of claim 10 wherein the reservation code number appears on a ticket in a machine-readable font and the automatic check-in means comprises ticket number reader apparatus.

12. The automatic reservation check-in system of claim 10 wherein the reservation code number appears in magnetic ink character recognition (MICR) font and contains information relating to the identity of the issuing system and a serial field which is arbitrary with respect to the reserved accommodation to which it is assigned by the system.

13. An automatic reservation check-in system comprising:
  a data processing system having means for storing information relating to a plurality of different numbered reservations for accommodations and processing means programmed to identify a particular reservation, responsive to signals representing a corresponding reservation number,
  means responsive to a request for a reservation for issuing a code number identifying reservation information,
  input means for providing to the storage means reservation information to be stored in relation to said identifying reservation number, and
  automatic check-in means responsive to reservation code numbers presented thereto and providing corresponding signal representations to said programmed reservation identification means of the processing system to control the grant of the reserved accommodations identified by the reservation code numbers presented.

14. The automatic reservation check-in system of claim 13 wherein the data processing system further comprises means for providing different lists of numbered reservations for accommodations to be provided for the same class and the check-in means identifies the class of the reservation number presented.

15. The automatic reservation check-in system of claim 13 wherein the reservation code number appears on a ticket in a machine-readable font and the automatic check-in means comprises ticket number reader apparatus.

16. The automatic reservation check-in system of claim 13 wherein the reservation code number appears in magnetic ink character recognition (MICR) font and contains information relating to the identity of the issuing system and a serial field which is arbitrary with respect to the reserved accommodation to which it is assigned by the system.

* * * * *